United States Patent [19]
Petersen et al.

[11] Patent Number: 4,950,449
[45] Date of Patent: * Aug. 21, 1990

[54] INHIBITION OF RADIOACTIVE COBALT DEPOSITION IN WATER-COOLED NUCLEAR REACTORS

[75] Inventors: George E. Petersen, Fremont; Randall N. Robinson, San Jose; Carl P. Ruiz, Fremont; William J. Marble, Gilroy; Barry M. Gordon, Monte Sereno; Gerald M. Gordon, Soquel, all of Calif.

[73] Assignee: General Electric Company, San Jose, Calif.

[*] Notice: The portion of the term of this patent subsequent to Jul. 26, 2005 has been disclaimed.

[21] Appl. No.: 160,725

[22] Filed: Feb. 26, 1988

Related U.S. Application Data

[63] Continuation-in-part of Ser. No. 900,927, Aug. 27, 1986, Pat. No. 4,759,900.

[51] Int. Cl.$^5$ ............................................. G21C 9/00
[52] U.S. Cl. ............................................. 376/306; 376/904
[58] Field of Search ............................... 376/306, 904

[56] References Cited

U.S. PATENT DOCUMENTS

| | | | |
|---|---|---|---|
| 2,795,560 | 6/1957 | Williams | 252/387 |
| 2,989,979 | 6/1961 | Karlson | 137/268 |
| 3,022,133 | 2/1962 | Hatch | 137/268 |
| 3,024,201 | 3/1962 | Bregman | 252/387 |
| 3,294,644 | 12/1966 | Walton | 176/38 |
| 3,390,695 | 7/1968 | King et al. | 137/268 |
| 3,532,639 | 10/1970 | Hatch | 252/389 |
| 3,580,934 | 5/1971 | Murray et al. | 252/389 |
| 3,589,858 | 6/1971 | Ralston | 422/18 |
| 3,615,730 | 10/1971 | Law et al. | 106/1 |
| 3,668,138 | 6/1972 | Hoover et al. | 252/181 |
| 3,669,616 | 6/1972 | Murray et al. | 422/3 |
| 3,699,052 | 10/1972 | Petrey et al. | 252/389 |
| 3,772,193 | 11/1973 | Nelli et al. | 210/62 |
| 3,817,268 | 6/1974 | Kirkwood | 137/268 |
| 3,850,767 | 11/1974 | Skedgell et al. | 204/56 R |
| 3,885,914 | 5/1975 | Hollingshad et al. | 252/401 |
| 3,943,960 | 3/1976 | Syrenne | 137/268 |
| 3,947,610 | 3/1976 | Bodmer et al. | 427/142 |
| 3,963,636 | 6/1976 | Harris et al. | 252/181 |
| 4,018,701 | 4/1977 | Ralston | 252/389 |
| 4,089,651 | 5/1978 | Scott | 252/387 |
| 4,111,830 | 9/1978 | Bannister | 422/17 |
| 4,333,493 | 6/1982 | Beiswenger et al. | 137/268 |
| 4,381,334 | 4/1983 | Balk | 428/332 |
| 4,410,446 | 10/1983 | Cheng et al. | 252/389 R |
| 4,548,228 | 10/1985 | Moore et al. | 137/268 |
| 4,710,266 | 12/1987 | Hayashi et al. | 252/629 |
| 4,725,383 | 2/1988 | Hayashi et al. | 252/629 |
| 4,756,874 | 7/1988 | Ruiz et al. | 376/306 |
| 4,759,900 | 7/1988 | Peterson et al. | 376/306 |
| 4,774,026 | 9/1988 | Kitamori et al. | 252/627 |

FOREIGN PATENT DOCUMENTS 59-215130 10/1984 Japan.

Primary Examiner—Charles T. Jordan
Assistant Examiner—J. Woodrow Eldred
Attorney, Agent, or Firm—Townsend & Townsend

[57] ABSTRACT

Deposition of radioactive cobalt on the interior surfaces of a water-cooled nuclear reactor and intergranular stress corrosion cracking are inhibited or substantially prevented by the continuous injection of zinc oxide to the reactor water. The zinc oxide may be prepared in the form of a paste, a slurry, or a preformed aqueous solution.

23 Claims, 2 Drawing Sheets

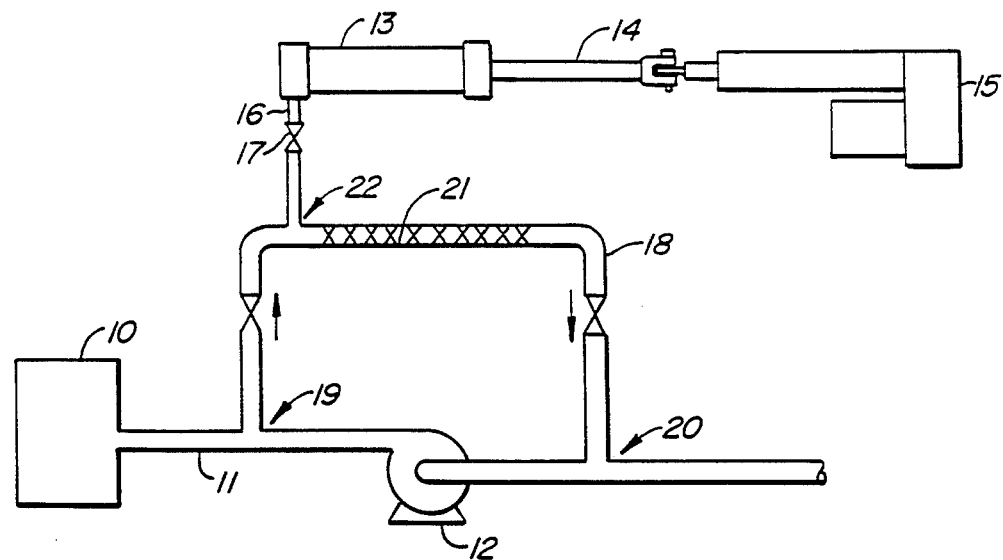
FIG._1.
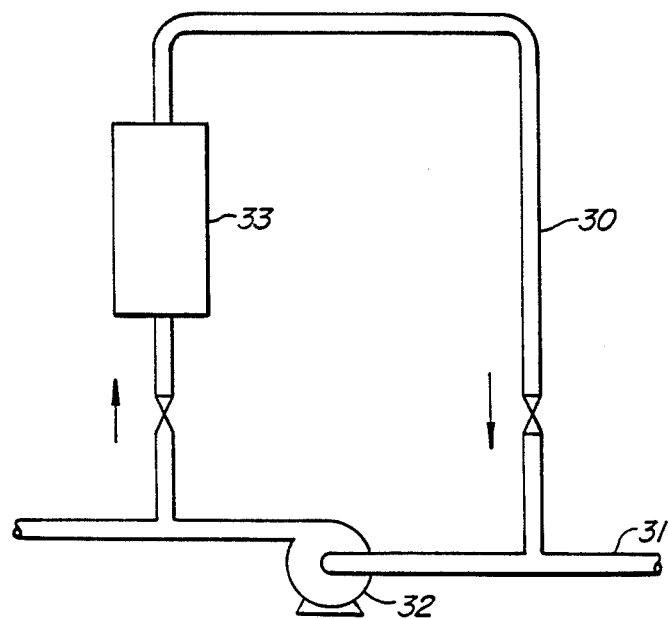
FIG._2.

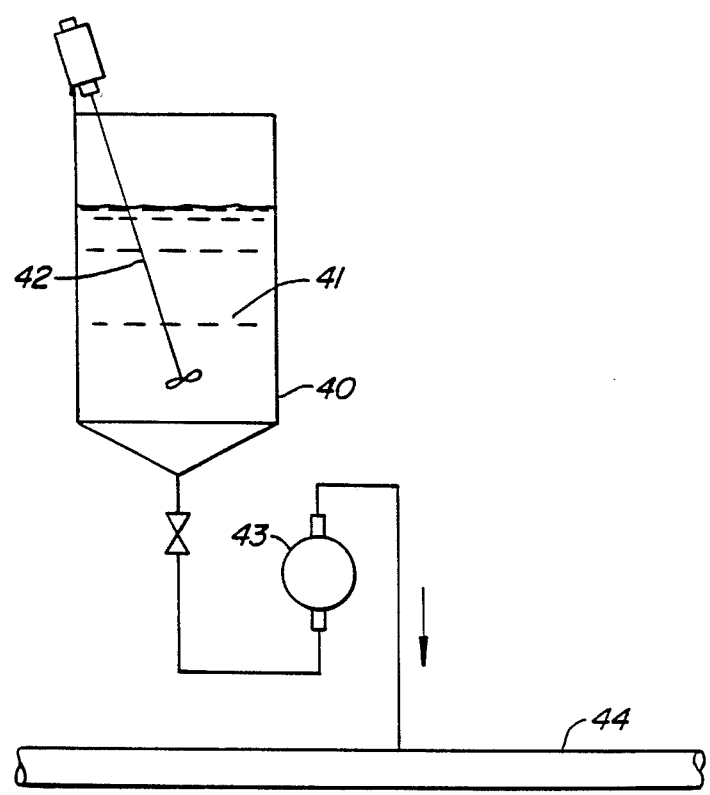
FIG._3.

INHIBITION OF RADIOACTIVE COBALT DEPOSITION IN WATER-COOLED NUCLEAR REACTORS

The present application is a continuation-in-part of application Ser. No. 900,927 filed on Aug. 27, 1986, now U.S. Pat. No. 4,759,900.

BACKGROUND OF THE INVENTION

This invention relates to the operation and safety of water-cooled nuclear reactors, and in particular to methods to prevent the deposition of radioactive cobalt and/or inhibit intergranular stress corrosion cracking in the water-bearing vessels of such reactors.

A major hazard in water-cooled nuclear reactors is the accumulation of radioactive substances in the structural portions of the reactor. During reactor shutdown, for instance, workers are exposed to internal walls and tubing surfaces, and radioactive materials retained in oxide films which have accumulated on these surfaces are a major source of radiation exposure.

A second problem encountered in the operation of water-cooled nuclear reactors is referred to as intergranular stress corrosion cracking (IGSCC) which can occur in the weld heat-affected zones of the piping and other system components. Although generally not a safety problem, such cracking is responsible for reduced plant reliability and availability. In cases of severe IGSCC, it has sometimes been necessary to replace entire piping systems at very high costs.

The introduction of certain metallic ions, including zinc, has been used to remove or lessen deposition of radioactive substances. The form and manner in which the zinc has been added, however, has had certain disadvantages. For instances, zinc has been added as a salt with anions which have been detrimental to the reactor, and the use of the active metallic ions before startup or during cleaning shutdowns has been of limited effectiveness in situations where long-term operation has occurred.

SUMMARY OF THE INVENTION

It has now been discovered that effective inhibition of radioactive cobalt deposition may be achieved by the continuous addition of zinc oxide to the water entering a water-bearing vessel of the reactor throughout the operation of the reactor. This provides the advantage of steady control of the radioactive cobalt accumulation, as well as efficient use of the zinc oxide, and total avoidance of the presence of anions harmful to the internal reactor surfaces.

The zinc oxide may be added in a variety of forms, examples of which are disclosed in detail below.

Surprisingly, it has been found that such zinc addition also results in the inhibition of IGSCC. Although the preferred zinc concentrations for inhibition of IGSCC are somewhat higher than the threshold levels required to prevent deposition of radioactive cobalt, operation at the higher zinc concentrations does not appear to adversely impact such deposition prevention.

BRIEF DESCRIPTION OF THE DRAWINGS

FIG. 1 is a flow diagram of one embodiment of the invention, designed to inject zinc oxide into the system in the form of a paste.

FIG. 2 is a flow diagram of the second embodiment of the invention, designed to add zinc oxide addition as a solution.

FIG. 3 is a flow diagram of the third embodiment of the invention, designed to add zinc oxide as a slurry.

DETAILED DESCRIPTION OF THE INVENTION

In accordance with the present invention, zinc oxide is added to the water in water-bearing vessels which tend to accumulate matter deposited in films along their surfaces and/or which suffer from IGSCC. The zinc oxide addition is done on a continuous basis throughout the operation of the reactor, providing a constant replenishment of zinc ion. A very small amount of zinc oxide will be sufficient to achieve inhibition of the radioactive cobalt deposition. The actual amount of zinc required to inhibit cobalt deposition is not critical, however, and may vary over a wide range. For most applications, a concentration of from about 1 to about 1,000 ppb (parts per billion by weight), preferably from about 10 to about 100 ppb maintained in the reactor water during operation of the reactor will provide the best results. For inhibiting IGSCC, however, the desired zinc concentration is somewhat higher, with a concentration of from about 5 to 1000 ppb being required, with a preferred concentration of from about 25 to 150 ppb. Thus, for the combined objectives of prevention of cobalt deposition and inhibition of IGSCC, the preferred concentration range will be from about 25 to 100 ppb although concentrations higher than the preferred range will also be generally effective.

The invention may be applied to any water-bearing vessel in a nuclear reactor in which deposition of radioactive cobalt may occur. Such vessels may include tubes, shelves, feed and recirculation piping, and transfer and storage vessels in general. Recirculation piping is of particular concern, since it is a major source of exposure to plant workers during maintenance shutdowns and is particularly subject to IGSCC. The zinc oxide may be added through feedlines to such vessels, or where appropriate, to recirculation lines branching off of such vessels.

The zinc oxide may be added in any form which permits it to be dissolved in the reactor water. Examples include slurries, pastes, and preformed solutions. When pastes or slurries are used the zinc oxide is preferably in the form of a finely divided powder, fumed zinc oxide being most preferred. The zinc oxide contents in these pastes and slurries are not critical, since the concentration in the reactor vessels where the zinc oxide is needed may be controlled by the rate of addition of the paste or slurry to the incoming water. In most cases, pastes will have zinc oxide contents ranging from about 25% to about 95% by weight, preferably from about 40% to 80%. Slurries will generally contain from about 0.1% to about 20% by weight, preferably from about 1% to about 5%.

The figures illustrate various ways in which the zinc oxide may be added.

In FIG. 1, the zinc oxide is added to the water-bearing vessel 10 by first combining the zinc oxide with water feed to the vessel through a feed conduit 11. Regulation of the flow rate through the feed conduit is achieved by a pump 12.

The arrangement shown in FIG. 1 is designed for the injection of a zinc oxide paste which is stored in a cylinder 13 fitted with an internal piston (not shown). For a nuclear reactor of typical size, it is contemplated that a typical cylinder size may be 3" (7.6 cm) in diameter and 20" (50.8 cm) in length. The shaft 14 of the piston is moved slowly forward by a motor-driven linear actuator 15. This may, for example, consist of an electric motor operating through a speed reducer and linear actuator moving at a rate of 0.001 inch (0.0025 cm) per minute.

As the piston moves to the left, the paste is forced out of the cylinder 13 through tubing 16. A stop valve 17 permits an operator to remove a depleted cylinder 13 without shutting down the feed line 11 or affecting the operation of the pump 12. A full cylinder may then be installed.

Rather than injecting the paste directly into the feed conduit 11, the paste is injected into a recirculation loop 18 which bridges a high pressure point 19 in the feed conduit (at the discharge end of the pump) with a low pressure point 20 (at the inlet or feed side of the pump 12). Circulation through this recirculation loop thus occurs in the clockwise direction in accordance with the arrangement shown in the drawing. An arrangement of static mixers 21 is positioned downstream of the injection point 22 where the paste from the cylinder 13 enters the recirculation loop 18.

In FIG. 2, the zinc oxide is added in the form of a solution formed by passing water through a bed of sintered zinc oxide pellets. Here, the flow arrangement is similar to that shown in FIG. 1—using a recirculation loop 30 branching off of a conduit 31 leading to the water-bearing vessel (not shown) sought to be protected from cobalt deposition. The conduit 31 may itself be a recirculation line or a feedwater line, and the flow rate through it is again controlled by a pump 32. The recirculation loop 30 brackets the pump 32. Water drawn into the recirculation loop enters a solid-retaining region 33 of the loop. This region contains solid zinc oxide with which water is in contact as it passes through. The region may be a trap, an expanded portion, or merely a segment of the piping closed off by screening or other construction designed to permit the passage of water while retaining solids.

Alternatively, the solid-retaining region may be a segment having walls lined with solid zinc oxide. It is preferred, however, that the zinc oxide be in pellet or particulate form, providing a high degree of surface area for contact between the water and the solid surface. A fixed or fluidized bed of zinc oxide particles or pellets may be used. The zinc oxide is preferably sintered, in pellets or a convenient shape. As the water passes through the pellet bed, it dissolves a portion of the zinc oxide, up to the solubility limit. A sufficient amount of zinc oxide may be charged to this retaining receptacle to last the entire life of the reactor.

FIG. 3 demonstrates the addition of zinc oxide in the form of a slurry, using an alternative configuration. The slurry is supplied directly from a reservoir 40 in which the slurry 41 is maintained in substantially homogeneous form by a stirrer 42. A pump 43 delivers the slurry at a fixed preselected rate to a flow conduit 44 which supplies water to the water-bearing vessels sought to be protected. As before, the relative flow rates of water through the flow conduit 44 and slurry through the pump 43 will determined the final concentration of dissolved zinc in the water-bearing vessel.

The present invention is applicable to water-cooled nuclear reactors in general, including light water reactors and heavy water reactors. The invention finds particular utility in pressurized water reactors and boiling water reactors.

The foregoing is offered primarily for purposes of illustration. It will be readily apparent to those skilled in the art that numerous modifications and variations of the features of construction and operation disclosed herein may be made without departing from the spirit and scope of the invention.

What is claimed is:

1. A method for inhibiting intergranular stress corrosion cracking and the deposition of radioactive cobalt in a water-bearing vessel of a water-cooled nuclear reactor, said method comprising:
adding zinc oxide to water entering said water-bearing vessel continuously during operation of said water-cooled nuclear reactor, wherein the amount of zinc oxide is selected to achieve a concentration in the range from about 25 to 150 ppb.

2. A method in accordance with claim 1 in which the amount of zinc oxide added is selected to achieve a concentration of about 25 to about 100 ppb zinc oxide in said water-bearing vessel, whereby the inhibition of IGSCC is optimized.

3. A method in accordance with claim 1 in which said zinc oxide is added in the form of a member selected from the group consisting of a water-based slurry, a water-based paste and a water-based solution.

4. A method in accordance with claim 1 comprising adding said zinc oxide to a conduit selected from the group consisting of a recirculation water line and a feedwater line discharging into said water-bearing vessel.

5. A method in accordance with claim 4 comprising adding said zinc oxide to a recirculation loop branching off of said conduit.

6. A method in accordance with claim 4 in which flow through said conduit is maintained by a pump in said conduit, and said method comprises adding said zinc oxide to a recirculation loop drawing water from the discharge side of said pump and returning said water to the feed side of said pump.

7. A method for inhibiting intergranular stress corrosion cracking and the deposition of radioactive cobalt in a water-bearing vessel of a water-cooled nuclear reactor, said method comprising:
adding a paste comprised of zinc oxide and water to water entering said water-bearing vessel continuously during operation of said water-cooled nuclear reactor, wherein sufficient paste is added to achieve a concentration of about 25 to 150 ppb zinc oxide in said water-bearing vessel.

8. A method in accordance with claim 7 in which the amount of zinc oxide in said paste is from about 25% to about 95% by weight.

9. A method in accordance with claim 7 in which the amount of zinc oxide in said paste is from about 40% to about 80% by weight.

10. A method in accordance with claim 7 comprising adding said paste to a conduit supplying water to said water-bearing vessel at a flow rate maintained by a pump in said conduit, by mixing said paste with water passing through a recirculation loop drawing water from the discharge side of said pump and returning said water to the feed side of said pump.

11. A method in accordance with claim 10 in which said mixing of said paste with said water passing through said recirculation loop is achieved by continuously injecting said paste into said recirculation loop at an injection point therein from a motor-driven hydraulic cylinder, and passing said paste through a static mixer in said recirculation loop downstream of said injection point.

12. A method for inhibiting intergranular stress corrosion cracking and the deposition of radioactive cobalt in a water-bearing vessel of a water-cooled nuclear reactor, said method comprising:
   (a) drawing water from a conduit supplying water to said water-bearing vessel and passing said drawn water through a recirculation loop discharging back into said conduit continuously during the operation of said water-cooled nuclear reactor; and
   (b) continuously during said operation injecting into said recirculation loop a paste comprised of zinc oxide at about 40% to about 80% by weight in water at an injection point at a rate selected to achieve a zinc oxide concentration of about 25 to about 150 ppb in said conduit.

13. A method for inhibiting intergranular stress corrosion cracking and the deposition of radioactive cobalt in a water-bearing vessel of a water-cooled nuclear reactor, said method comprising:
   adding an aqueous solution of zinc oxide to water entering said water-bearing vessel, continuously during operation of said water-cooled nuclear reactor, wherein a sufficient amount of the solution is added to achieve a concentration of about 25 to 150 ppb zinc oxide in said water-bearing vessel.

14. A method in accordance with claim 13 in which said aqueous solution is formed by passing a stream of water drawn from said water entering said water-bearing vessel through a receptacle containing said zinc oxide retained therein.

15. A method in accordance with claim 14 in which said solid zinc oxide is a bed of zinc oxide particles.

16. A method in accordance with claim 15 in which said zinc oxide particles are sintered into zinc oxide pellets.

17. A method in accordance with claim 13 in which said aqueous solution is formed in a recirculation loop branching off of a conduit supplying said water to said water-bearing vessel, said recirculation loop containing a bed of sintered zinc oxide pellets, and said aqueous solution is formed by passing a stream of water drawn from said conduit through said recirculation loop.

18. A method in accordance with claim 17 in which the flow rate through said conduit is controlled by a pump, and said recirculation loop is positioned to draw water from a point at the discharge side of said pump and to discharge water at the feed side of said pump.

19. A method for inhibiting intergranular stress corrosion cracking and the deposition of radioactive cobalt in a water-bearing vessel of a water-cooled nuclear reactor, said method comprising:
   adding a slurry of zinc oxide in water to water entering said water-bearing vessel, continuously during operation of said water-cooled nuclear reactor, wherein sufficient slurry is added to achieve a concentration of about 25 to 150 ppb zinc oxide in said water-bearing vessel.

20. A method in accordance with claim 19 in which the zinc oxide content of said slurry is from about 0.1% to about 20% by weight.

21. A method in accordance with claim 19 in which the zinc oxide content of said slurry is from about 1% to about 5% by weight.

22. A method in accordance with claim 19 in which said zinc oxide in said slurry is fumed zinc oxide.

23. A method in accordance with claim 19 in which the rate of addition of said slurry to said water is selected to produce a zinc oxide content in the water of said water-bearing vessel of about 25 to about 100 ppb.

* * * * *